United States Patent
Lai et al.

(10) Patent No.: US 11,846,556 B2
(45) Date of Patent: Dec. 19, 2023

(54) DUAL-LOOP TORQUE SENSING SYSTEM AND METHOD THEREOF

(71) Applicant: TECHMAN ROBOT INC., Taoyuan (TW)

(72) Inventors: Chun-Wen Lai, Taoyuan (TW); Yu-Chin Jiang, Taoyuan (TW)

(73) Assignee: TECHMAN ROBOT INC., Taoyuan (TW)

( * ) Notice: Subject to any disclaimer, the term of this patent is extended or adjusted under 35 U.S.C. 154(b) by 187 days.

(21) Appl. No.: 17/519,534

(22) Filed: Nov. 4, 2021

(65) Prior Publication Data
US 2022/0196504 A1 Jun. 23, 2022

(30) Foreign Application Priority Data
Dec. 22, 2020 (TW) .................................. 109145868

(51) Int. Cl.
*G01L 25/00* (2006.01)
*G01L 3/04* (2006.01)

(52) U.S. Cl.
CPC .............. *G01L 25/003* (2013.01); *G01L 3/04* (2013.01)

(58) Field of Classification Search
CPC ................................ G01L 25/003; G01L 3/04
See application file for complete search history.

(56) References Cited

U.S. PATENT DOCUMENTS

| | | | | |
|---|---|---|---|---|
| 2009/0200978 A1* | 8/2009 | Kato | ...................... | B25J 9/1674 318/566 |
| 2012/0065781 A1* | 3/2012 | Ikeda | ..................... | B25J 9/1674 700/261 |
| 2016/0229445 A1* | 8/2016 | Sasaki | .................. | B62D 5/0484 |
| 2019/0346329 A1* | 11/2019 | Suzuki | .................. | G01L 5/0042 |
| 2022/0126461 A1* | 4/2022 | Tanaka | .................. | G01L 5/0061 |

OTHER PUBLICATIONS

Yen, Shih-Hsiang, et al. "A sensorless and low-gain brushless DC motor controller using a simplified dynamic force compensator for robot arm application." Sensors 19.14 (2019): 3171. (Year: 2019).*
Komiyama, Hiroki, and Yutaka Uchimura. "Speed control and sensorless force control with magnetic gear." 2010 11th IEEE International Workshop on Advanced Motion Control (AMC). IEEE, 2010. (Year: 2010).*
Andrzejewski, Andrzej. "The universal speed controller for time-minimal and without overshoot speed control of DC motor." 2008 Conference on Human System Interactions. IEEE, 2008. (Year: 2008).*

* cited by examiner

*Primary Examiner* — Raymond L Nimox
(74) *Attorney, Agent, or Firm* — Winston Hsu (57) ABSTRACT

A dual-loop torque sensing system includes four position sensors disposed in the motor and the reduction drive to form a dual-loop for detection to calculate the output torques. The detection of the position sensors is for confirming abnormality of the dual-loop or the position sensors. A failure alarm is issued to enhance the safety of the working environment.

17 Claims, 5 Drawing Sheets

DUAL-LOOP TORQUE SENSING SYSTEM AND METHOD THEREOF

BACKGROUND OF THE INVENTION

1. Field of the Invention

The present invention is related to a torque sensing system and method, in particular to a dual-loop torque sensing system and method for detecting whether the sensors and the dual-loop are operating normally.

2. Description of the Prior Art

Robotic arms have the characteristics of flexible movement, precise positioning and continuous operation, and have become the best tools for manufacturing and assembly on production lines. However, the operation of the robotic arms directly affects the safety of the surrounding workers, so the safety of the robotic arms operation has become an important issue in the industry.

Figure 1:
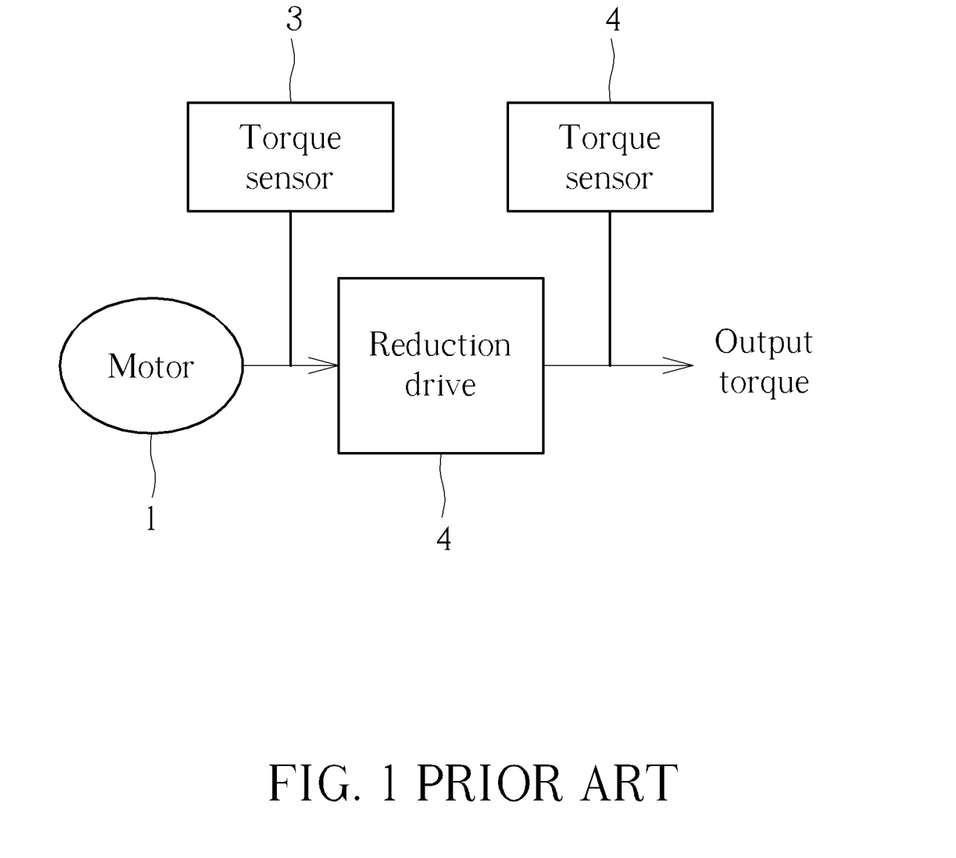
FIG. 1 is a diagram of a conventional motor, a reduction drive and torque sensors of the prior art.

FIG. 1 is a diagram of a conventional motor, a reduction drive and torque sensor of prior art. The prior art generally senses the torque of the robotic arm by setting a torque sensor 3 on a motor 1 of the joint module, and measuring the torque of the motor 1 with a strain gauge. The output torque of the motor 1 is transmitted to a reduction drive 2, and the reduction drive 2 reduces the output torque. Also the reduction drive 2 is equipped with a torque sensor 4, and an output torque is detected by using the strain gauge inside. However, a single torque sensor cannot detect abnormal operation of itself, which can affect workers' safety. Therefore, the robotic arm of the prior art is equipped with the torque sensors 3 and 4 in the motor 1 and the reduction drive 2 respectively, and each sensor can detect torque. Once the torque values do not match, the sensor is determined to be abnormal, and the robotic arm stops functioning to ensure the operation safety.

However, for the application of torque sensors, the requirements for assembly are extremely strict. Complex calibration procedures and additional mechanism design are required to avoid the interference of stress and torque in other directions, so that torque can be correctly detected. The installation of the torque sensor in a robotic arm can be complicated and high cost. After sensing the torque being abnormal, the safety mechanism would be activated to stop the robotic arm, causing production interruption and affecting the production efficiency of the factory. In addition, when abnormal torque is sensed, it is impossible to determine which torque sensor has failed. Therefore, it is necessary to stop the robotic arm and examine each torque sensor one by one. This can also be time-consuming. Therefore, these problems in the torque sensing system of the robotic arm need to be solved urgently.

SUMMARY OF THE INVENTION

The objective of the present invention is to provide a dual-loop torque sensing system and its sensing method. By providing position sensors coupled to a motor and a reduction drive, the difference in the rotational position of the motor and the reduction drive is detected to measure the output torque, so as to simplify the structure and installation of the torque sensing system.

Another objective of the present invention is to provide a dual-loop torque sensing system and its sensing method using the motor and the reduction drive with four position sensors to keep the dual-loop torque sensing system functioning when one of the two sensing loops fails. This improves the safety of the working environment.

Another objective of the present invention is to provide a dual-loop torque sensing system and its sensing method using the four position sensors to detect whether one of the position sensors has malfunctioned. Another position sensor can replace the function of the malfunctioned position sensor to avoid downtime and to improve production efficiency.

In order to achieve the objective of the invention, the embodiment of the present invention provides a dual-loop torque sensing system including the following components. A motor is coupled to a reduction drive to reduce the output torque. A reduction drive is coupled to a first position sensor and a second position sensor for sensing the rotation state of the reduction drive. The motor is coupled to a third position sensor and a fourth position sensor for sensing the rotation state of the motor. The first position sensor and the third position sensor are disposed in a first sensing loop, and the second position sensor and the fourth position sensor are disposed in the second sensing loop. A control device is coupled to the first sensing loop and the second sensing loop. The control device includes the following components. A reading circuit is coupled to the four position sensors to read the detection values. A calculation circuit is coupled to the reading circuit to receive the detection values to perform torque calculation. A comparison circuit is coupled to the calculation circuit to receive a calculation result from the calculation circuit and outputs an identification signal or a normal signal according to the calculation result. A search circuit is coupled to the comparison circuit to receive the identification signal, and after searching for an abnormal position sensor according the identification signal, output a search signal to a torque output circuit. The torque output circuit receives the search signal or the normal signal, and outputs a first torque value according to the detection value of the position sensors of the first sensing loop and/or outputs a second torque value according to the detection value of the position sensors of the second sensing loop.

The embodiment of the present invention provides a method for the dual-loop torque sensing system. The method includes reading first time detection values of the position sensors coupled to the reduction drive and first time detection values of the position sensors coupled to the motor, reading second time detection values of the position sensors coupled to the reduction drive and second time detection values of the position sensors coupled to the motor at a preset time, calculating a first absolute speed value, a second absolute speed value, a third absolute speed value and a fourth absolute speed value corresponding to the four position sensors according to the first time detection value, the second time detection value, a reduction ratio and a length of a preset time period, if an absolute difference between the first absolute speed value and the second absolute speed value is less than a threshold value and an absolute difference between the third absolute speed value and the fourth absolute speed value is less than the threshold value, determining the position sensors coupled to the motor and the position sensors coupled to the reduction drive being normal, and outputting a first torque value and a second torque value.

The method further includes if the absolute difference between the first absolute speed value and the second absolute speed value or the absolute difference between the third absolute speed value and the fourth absolute speed value is greater than the threshold value, determining at least two of the first position sensor, the second position sensor, the third position sensor, and the fourth position sensor being abnormal, and issuing a notification signal to stop a robotic arm, if the absolute difference between the first absolute speed value and the second absolute speed value or the absolute difference between the third absolute speed value and the fourth absolute speed value is greater than the threshold value, determining at least one of the first position sensor, the second position sensor, the third position sensor, and the fourth position sensor being abnormal, and the robotic arm continuing to operate and issuing an alarm for warning.

These and other objectives of the present invention will no doubt become obvious to those of ordinary skill in the art after reading the following detailed description of the preferred embodiment that is illustrated in the various figures and drawings.

DETAILED DESCRIPTION

Regarding to the technical means adopted by the present invention in order to achieve the above-mentioned objective, embodiments and figures are described as follows.

Figure 2:
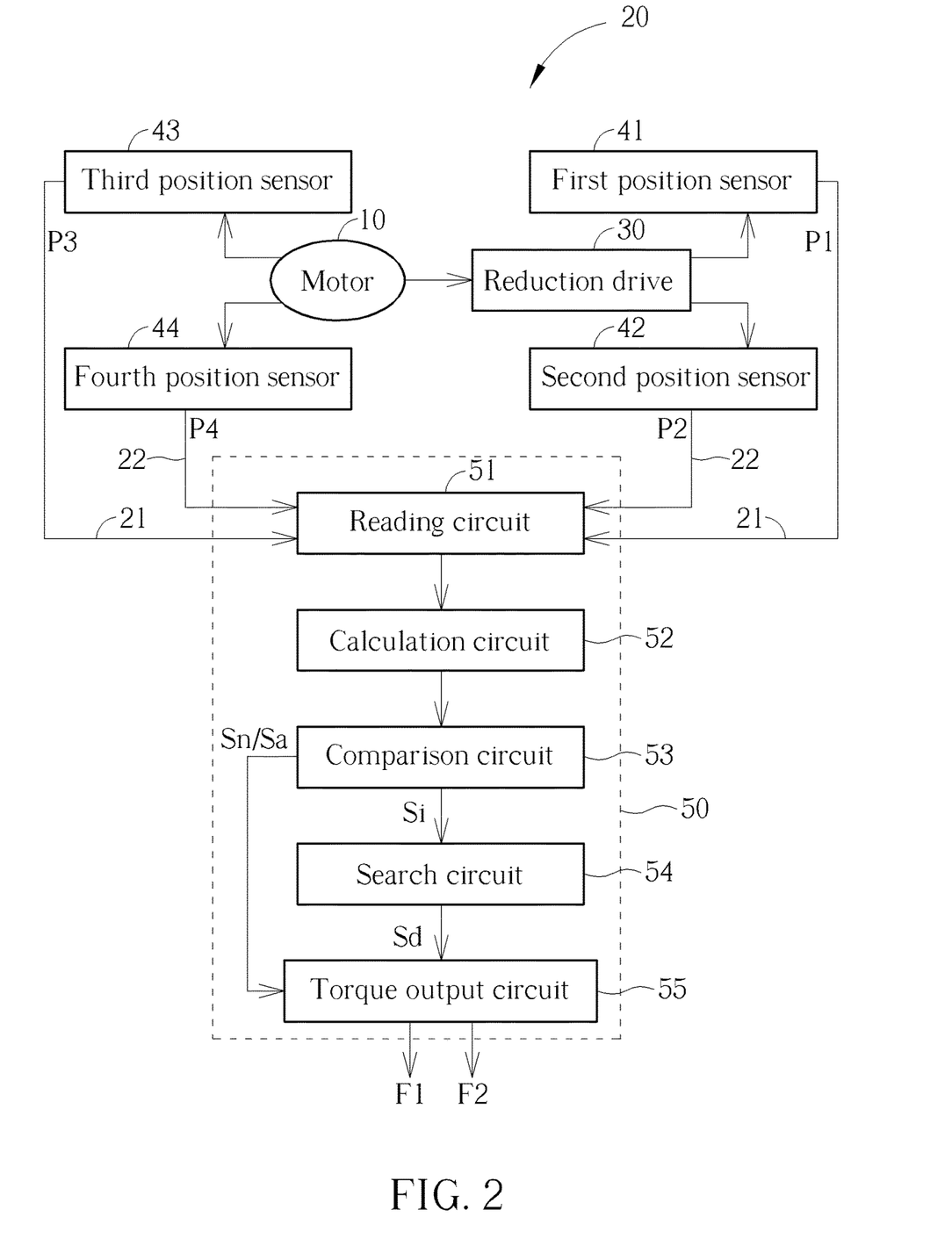
FIG. 2 is a diagram of the dual-loop torque sensing system of the present invention.

FIG. 2 is a diagram of the dual-loop torque sensing system 20 of the present invention. A motor 10 is coupled to a reduction drive 30 and generates an output torque to the reduction drive 30, and the reduction drive 30 reduces the output torque and generates a driving torque. The reduction drive 30 is coupled to a first position sensor 41 and a second position sensor 42. The motor 10 is coupled to a third position sensor 43 and a fourth position sensor 44. In the embodiment, each of the position sensors 41 to 44 may be, for example, an encoder. As long as each of the position sensors 41 to 44 can detect the motor 10 and the reduction drive 30, the installation place of each of the position sensors 41 to 44 should not be limited.

In the dual-loop torque sensing system 20, the first position sensor 41 and the third position sensor 43 are disposed in the first sensing loop 21. The third position sensor 43 is coupled to the motor 10 and detects rotation state of the motor 10. The first position sensor 41 is coupled to the reduction drive 30 and detects the rotation state after the rotation is reduced. In the present invention, the second position sensor 42 and the fourth position sensor 44 are arranged in the second sensing loop 22. The fourth position sensor 44 is coupled to the motor 10 and detects its rotation state. The second position sensor 42 is coupled to the reduction drive 30 and detects the rotation state after reducing its rotation speed. The rotation state can be rotation speed or rotation angle.

The dual-loop torque sensing system 20 further includes a control device 50. The control device 50 includes a reading circuit 51, a calculation circuit 52, a comparison circuit 53, a search circuit 54 and a torque output circuit 55. The reading circuit 51 is coupled to the position sensor 41 to 44 for reading a first detection value P1, a second detection value P2, a third detection value P3 and a fourth detection value P4 of the corresponding position sensors 41, 42, 43 and 44 respectively. The reading circuit 51 is coupled to the calculation circuit 52 and outputs the detection values P1, P2, P3, and P4 to the calculation circuit 52 for further processing. The calculation circuit 52 is coupled to the comparison circuit 53 and outputs a calculation result to the comparison circuit 53. The comparison circuit 53 can either output an identification signal Si or a normal signal Sn according to the calculation result. The comparison circuit 53 is coupled to the search circuit 54 and the torque output circuit 55, and outputs the identification signal Si to the search circuit 54 or the normal signal Sn to the torque output circuit 55. The search circuit 54 is coupled to the torque output circuit 55, and outputs a search signal Sd to the torque output circuit 55 after searching for an abnormal position sensor according to the identification signal Si. The torque output circuit 55 is coupled to the comparison circuit 53 and the search circuit 54, and outputs a first torque value F1 and/or a second torque value F2 according to the position sensors 41 to 44.

The control device 50 is coupled to the first sensing loop 21 and the second sensing loop 22. The first position sensor 41 of the first sensing loop 21 detects the driving state of the reduction drive 30 after reducing the rotation speed to generate the first detection value P1. The third position sensor 43 of the first sensing loop 21 detects the rotation state of the motor 10 and generates the third detection value P3. Since the reduction ratio of the reduction drive 30 is fixed, the rotation state of the motor 10 detected by the third position sensor 43 has a fixed proportional ratio with the rotation state after reducing the rotation speed (that is, the driving state) detected by the fourth position sensor 41. The control device 50 uses the reading circuit 51 to read the first detection value P1 and the third detection value P3 and transmits the detection values P1 and P3 to the calculation circuit 52 for calculation. When the rotation states of the motor 10 and of the reduction drive 30 different from the fixed proportional ratio of the reduction ratio, resulting in difference of rotation states, such as a difference in rotation positions, the position difference ratio can be used to calculate the first torque value F1 outputted by the first sensing loop 21 after detecting the rotation states. The calculation method is described in a later paragraph.

Similarly, the second detection value P2 detected by the second position sensor 42 of the second sensing loop 22 and the fourth detection value P4 detected by the fourth position sensor 44 of the second sensing loop 22 have the position difference ratio to calculate the second torque value F2 outputted by the second sensing loop 22 after detecting the rotation states. The dual-loop torque sensing system 20 can use the position sensors 41 to 44 to detect the output torque change of the motor 10 to sense a collision of robotic arms in the working environment. It is equivalent to detecting the motion state of the robotic arm and then controlling the operation of the motor 10. Therefore, the dual-loop torque sensing system 20 can detect the output torque of the motor 10 and the driving torque of the reduction drive 30 through the position sensors 41 to 44 without using a torque sensor, so that the structure and installation of the dual-loop torque sensing system 20 can be simplified comparing to the prior art.

In the dual-loop torque sensing system 20, when the first sensing loop 21, formed by the motor 10, the first position sensor 41, the third position sensor 43 and the reduction drive 30, fails to operate normally, the second sensing loop 22 formed by the motor 10, the second position sensor 42, the fourth position sensor 44 and the reduction drive 30, can still operate normally to maintain safe operation of the robotic arm. Similarly, when the second sensing loop 22 fails, the first sensing loop 21 can also operate normally to maintain safe operation of the robotic arm. In other words, the motor 10 and the reduction drive 30 with the four position sensor 41 to 44 construct the dual-loop torque sensing system 20 to improve the safety of the working environment.

The control device 50 can determine whether each of the position sensors 41 to 44, the first sensing loop 21 and the second sensing loop 22 is operating normally. The control device 50 controls the reading circuit 51 to read each of the position sensors 41 to 44 twice at different times to obtain the first detection values P1 and P1', the second detection values P2 and P2', and the third detection values P3 and P3' and the fourth detection values P4 and P4'. The detection values represent the two different rotation positions. The preset time period T (or delay time) between the two readings can be tens or hundreds of milliseconds.

Furthermore, after reading the position sensors 41 to 44 twice, the reading circuit 51 can output the detection values P3 and P3' of the third position sensor 43, and the detection values P4 and P4' of the fourth position sensor 44 to the calculation circuit 52. The calculation circuit 52 divide the rotation position difference between the detection values P3, P3', P4, and P4' by the time difference T to calculate the absolute speed of the rotation of the motor 10 respectively. The third absolute speed value V3 can be calculated by V3=(P3'−P3)/T. The fourth absolute speed value V4 can be calculated by V4=(P4'−P4)/T. Since the third position sensor 43 and the fourth position sensor 44 detect the same motor 10, the third absolute speed value V3 and the fourth absolute speed value V4 should be substantially equal.

In the same way, the detection values P1 and P1' of the first position sensor 41, and the detection values P2 and P2' of the second position sensor 42 coupled to the reduction drive 30 can also be used to calculate the absolute speed of the reduction drive 30 after reducing the rotation speed. To compare the absolute speed of the motor 10, the rotation speed of the reduction drive needs to be multiplied by the reduction ratio N. The first absolute speed value V1 can be calculated by V1=(P1'−P1)×N/T. The second absolute speed value V2 can be calculated by V2=(P2'−P2)×N/T. Since the first position sensor 41 and the second position sensor 42 detect the same reduction drive 30, the first absolute speed value V1 and the second absolute speed value V2 should be substantially equal. Also, they should be substantially equal to the third absolute speed value V3 and the fourth absolute speed value V4.

The calculation circuit 52 controlled by the control device 50 transmits the calculation result to the comparison circuit 53. The comparison circuit 53 determines whether the absolute difference between the first absolute speed value V1 and the second absolute speed value V2 is less than a threshold value Cri. The dual-loop torque sensing system 20 can determine whether the first position sensor 41 and the second position sensor 42 are functioning normally or not accordingly. In the same way, the comparison circuit 53 determines whether the absolute difference between the third absolute speed value V3 and the fourth absolute speed value V4 is less than a threshold value Cri. The dual-loop torque sensing system 20 can determine whether the third position sensor 43 and the fourth position sensor 44 are functioning normally or not accordingly.

When the absolute difference between the first absolute speed value V1 and the second absolute speed value V2 is less than the threshold value Cri, the dual-loop torque sensing system 20 determines that the first position sensor 41 and the second position sensor 42 are functioning normally. When the absolute difference between the third absolute speed value V3 and the fourth absolute speed value V4 is less than the threshold value Cri, the dual-loop torque sensing system. 20 determines that the third position sensor 43 and the fourth position sensor 44 are functioning normally. As the result, the comparison circuit 53 transmits a normal signal Sn to the torque output circuit 55. After receiving the normal signal Sn, a first torque value F1 and a second torque value F2 of the first sensing loop 21 and the second sensing loop 22 respectively are calculated according to the detection values P1, P2, P3, and P4. For example, the detection value P3 of the third position sensor 43 coupled to the motor 10 in the first sensing loop 21 is converted to the reduced speed state by the formula P3×N/360, where N is the reduction ratio. P3×N/360 has a rotation difference to the detection value P1 of the first position sensor 41 coupled to the reduction drive 30. It is then multiplied by the reducer parameter K of the reduction drive 30 to calculate the output torque of the first sensing loop 21. The formula for calculating the first torque value is F1=K×(P1−(P3×N/360)). Similarly, the output torque value F2 of the second sensing loop 22 can also be calculated according to the detection value P2 of the second position sensor 42 and the detection value P4 of the fourth position sensor 44. The second torque value can be calculated by the formula F2=K×(P2−(P4×N/360)).

If the absolute difference between the first absolute speed value V1 and the second absolute speed value V2 or the absolute difference between the third absolute speed value V3 and the fourth absolute speed value V4 is greater than the threshold value Cri, the dual-loop torque sensing system 20 can determine that at least two of the first position sensor 41, the second position sensor 42, the third position sensor 43, and the fourth position sensor 44 are abnormal, and a notification signal is issued to stop a robotic arm. The torque output circuit 55 receives an abnormal signal Sa from the comparison circuit 53 and does not perform and output torque value calculation. If the absolute difference between the first absolute speed value V1 and the second absolute speed value V2 or the absolute difference between the third absolute speed value V3 and the fourth absolute speed value V4 is greater than the threshold value Cri, the dual-loop torque sensing system 20 can determine that at least one of the first position sensor 41, the second position sensor 42, the third position sensor 43, and the fourth position sensor 44 is abnormal and searching for the abnormal sensor is needed.

When the dual-loop torque sensing system 20 determines that at least one of the position sensors is abnormal, the comparison circuit 53 informs the search circuit 54 to search for the abnormal position sensor. If the absolute difference between the first absolute speed value V1 and the second absolute speed value V2 is greater than the threshold value Cri, the search circuit 54 sets the third absolute speed value V3 or the fourth absolute speed value V4 as the search threshold value c. Then the search threshold value c, the first absolute speed value V1 and the second absolute value V2 are arranged in descending order. The position sensor corresponding to the absolute speed value that is farther from the search threshold value c is determined to be abnormal. If the absolute difference between the third absolute speed value V3 and the fourth absolute speed value V4 is greater than the threshold value Cri, the search circuit 54 sets the first absolute speed value V1 or the second absolute speed value V2 as the search threshold value c. Then the search threshold value c, the third absolute speed value V3, and the fourth absolute speed value V4 are arranged in descending order, and the position sensor corresponding to the absolute speed value that is farther from the search threshold value c is determined to be abnormal.

After the search circuit 54 determines the abnormal position sensor, it outputs a search signal Sd to notify the torque output circuit 55. The search signal Sd can be used to indicate abnormal position sensors, such as the high and low levels or positive and negative values of the search signal Sd. In this way, the torque output circuit 55 receives the search signal Sd can determine which of the first position sensor 41 and the second position sensor 42, the third position sensor 43, and the fourth position sensor 44 is abnormal according to the search signal Sd. When the search signal Sd indicates that the first position sensor 41 or the third position sensor 43 is abnormal, the torque output circuit 55 outputs the second torque value F2. When the search signal Sd indicates the second position sensor 42 or the fourth position sensor 44 is abnormal, the torque output circuit 55 outputs the first torque value F1.

Figure 3:
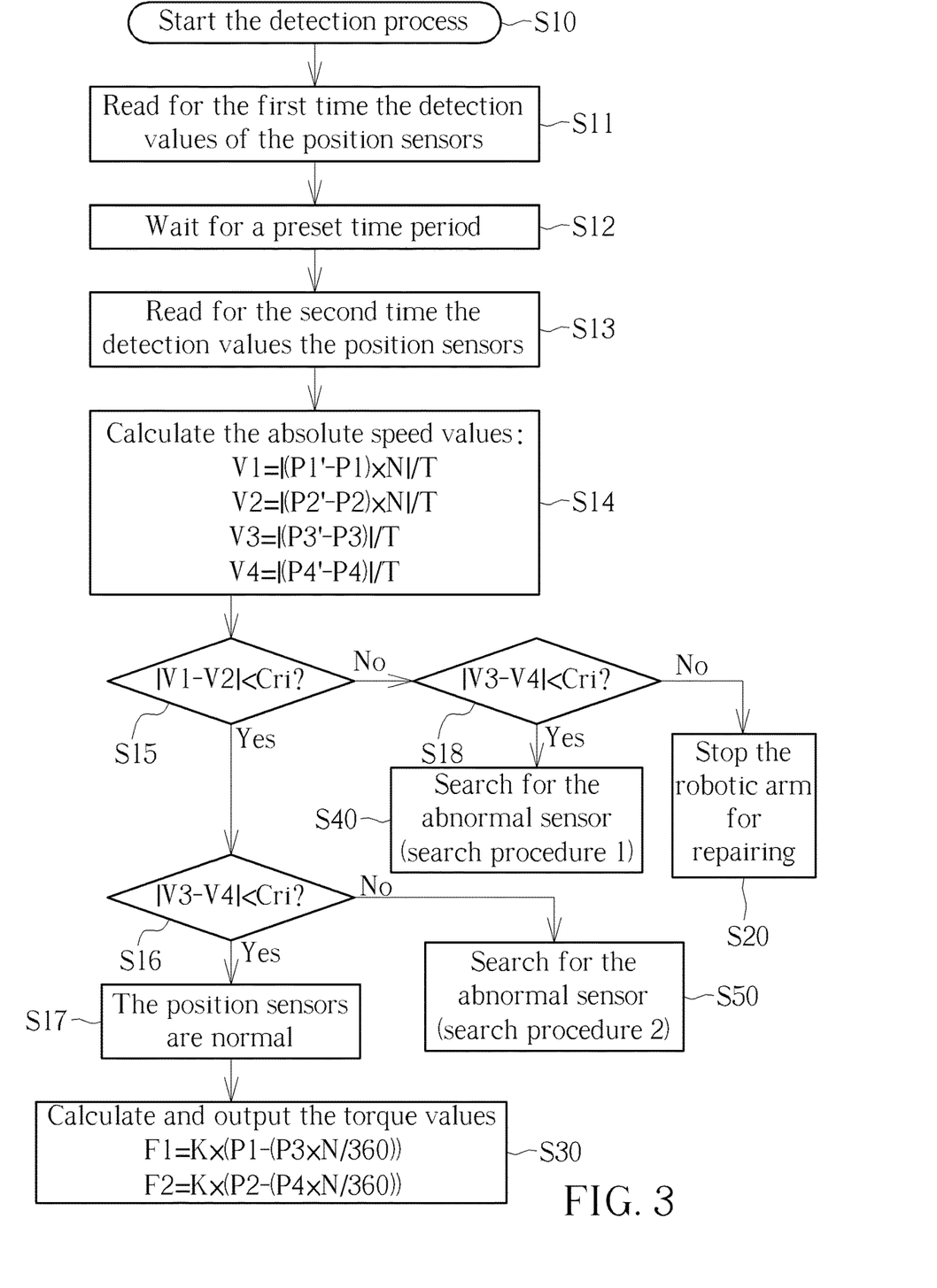
FIG. 3 is a flowchart of a method for the dual-loop torque sensing system of FIG. 2.

FIG. 3 is a flowchart of method for operating the dual-loop torque sensing system 20 of FIG. 2. The detailed steps are described as follows:

S10: Start the detection process;

S11: Read for the first time the detection values P1 and P2 of the position sensors 41 and 42 and the detection values P3 and P4 of the position sensors 43 and 44;

S12: Wait for a preset time period T;

S13: Read for the second time the detection values P1', P2', P3' and P4' of the position sensors 41, 42, 43 and 44 respectively;

S14: According to the detection values P1 and P1', P2 and P2', P3 and P3', P4 and P4', a length of the preset time period T and the reduction ratio N, the absolute speed values of the four position sensors are calculated by the following formulas:

the first absolute speed value $V1=|(P1'-P1)\times N|/T;$ the second absolute speed value $V2=|(P2'-P2)\times N|/T;$ the third absolute speed value $V3=|(P3'-P3)|/T;$ the fourth absolute speed value $V4=|(P4'-P4)|/T;$ S15: Compare the absolute difference between the first absolute speed value V1 and the second absolute speed value V2 to the threshold value Cri; if the absolute difference is less than the threshold value Cri, it indicates that the position sensors coupled to the reduction drive 30 are normal and proceed to step S16; if not, it indicates that the position sensors of the reduction drive 30 are abnormal, proceed to step S18;

S16: Compare the absolute difference between the third absolute speed value V3 and the fourth absolute speed value V4 to the threshold value Cri; if the absolute difference is less than the threshold value Cri, proceed to step S17; if not, proceed to step S50;

S17: Determine the four position sensors are normal; Proceed to step S30;

S18: Compare the absolute difference between the third absolute speed value V3 and the fourth absolute speed value V4 to the threshold value Cri; if the absolute difference is less than the threshold value Cri, it indicates that the position sensors coupled to the motor 10 are normal, proceed to Step S40; it not, then proceed to step S20;

S20: Stop the robotic arm for repairing.

S30: Calculate the first torque value $F1=K\times(P1-(P3\times N/360))$ of the first sensing circuit 21 and the second torque value $F2=K\times(P2-(P4\times N/360))$ of the second sensing circuit 22 according to the reduction ratio N and the reducer parameter K, and output the torque values.

S40: Search for the abnormal sensor (search procedure 1).

S50: Search for the abnormal sensor (search procedure 2).

Figure 4:
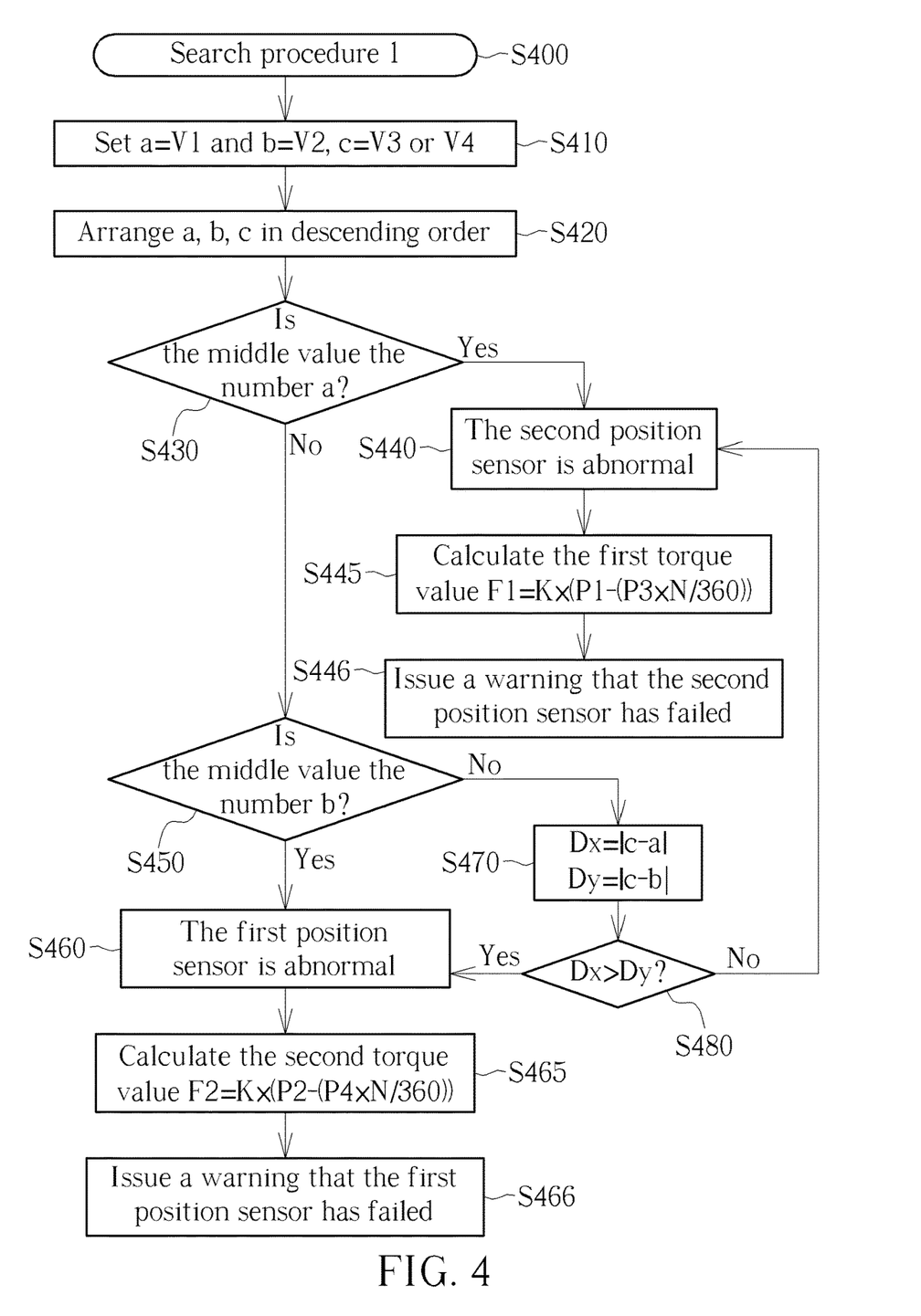
FIG. 4 is a flowchart of the search procedure 1 for searching the abnormal position sensor in the method for the dual-loop torque sensing system of FIG. 3.

FIG. 4 is a flowchart of the search procedure 1 for searching the abnormal position sensors in the method for the dual-loop torque sensing system of FIG. 3. When the position sensor of the motor 10 is normal but the position sensors coupled to the reduction drive 30 are abnormal, the dual-loop sensing system 20 starts to search for the abnormal position sensors according to the search procedure 1. The detailed steps are as follows:

S400: Enter the search procedure 1 for searching the abnormal position sensor;

S410: Set the absolute speed values V1 and V2 to a=V1 and b=V2; because the position sensors coupled to the motor 10 are functioning normally, the third absolute speed value V3 or the fourth absolute speed value V4 is set as the search threshold value c; proceed to step S420;

S420: Arrange the absolute speed values in descending order;

S430: Determine if the middle value of the three values is the number a; if the middle value is the number a, it indicates the absolute speed value V2 has a large error comparing to the search threshold value c, the corresponding second position sensor 42 is abnormal, and the second sensing loop 22 is abnormal; proceed to step S440; if not, proceed to step S450;

S440: Determine that the second position sensor 42 is abnormal; proceed to step S445;

S445: Calculate the first torque value $F1=K\times(P1-(P3\times N/360))$ of the first sensing loop 21; proceed to step S446;

S446: Issue a warning that the second position sensor 42 has failed.

S450: Determine if the middle value of the three values is the number b; if the middle value is the number b, it indicates the absolute speed value V1 has a large error comparing to the search threshold value c, the corresponding first position sensor 41 is abnormal, and the first sensing loop 21 is abnormal; proceed to step S460; if not, proceed to step S470;

S460: Determine that the first position sensor 41 is abnormal; proceed to step S465;

S465: Calculate the second torque value $F2=K\times(P2-(P4\times N/360))$ of the second sensing loop 22; proceed to step S466;

S466: Issue a warning that the first position sensor 41 has failed.

S470: Calculate the absolute difference between the search threshold value c and the number a, and the absolute difference between the search threshold value c and the number b, Dx=|c−a|, Dy=|c−b|;

S480: Is Dx greater than Dy? If yes, it indicates that the absolute speed value V1 has greater error, and the corresponding first position sensor 41 is abnormal, proceed to step S460; if not, it indicates that the absolute speed value V2 has greater error, and the corresponding second position sensor 42 is abnormal, proceed to step S440.

Figure 5:
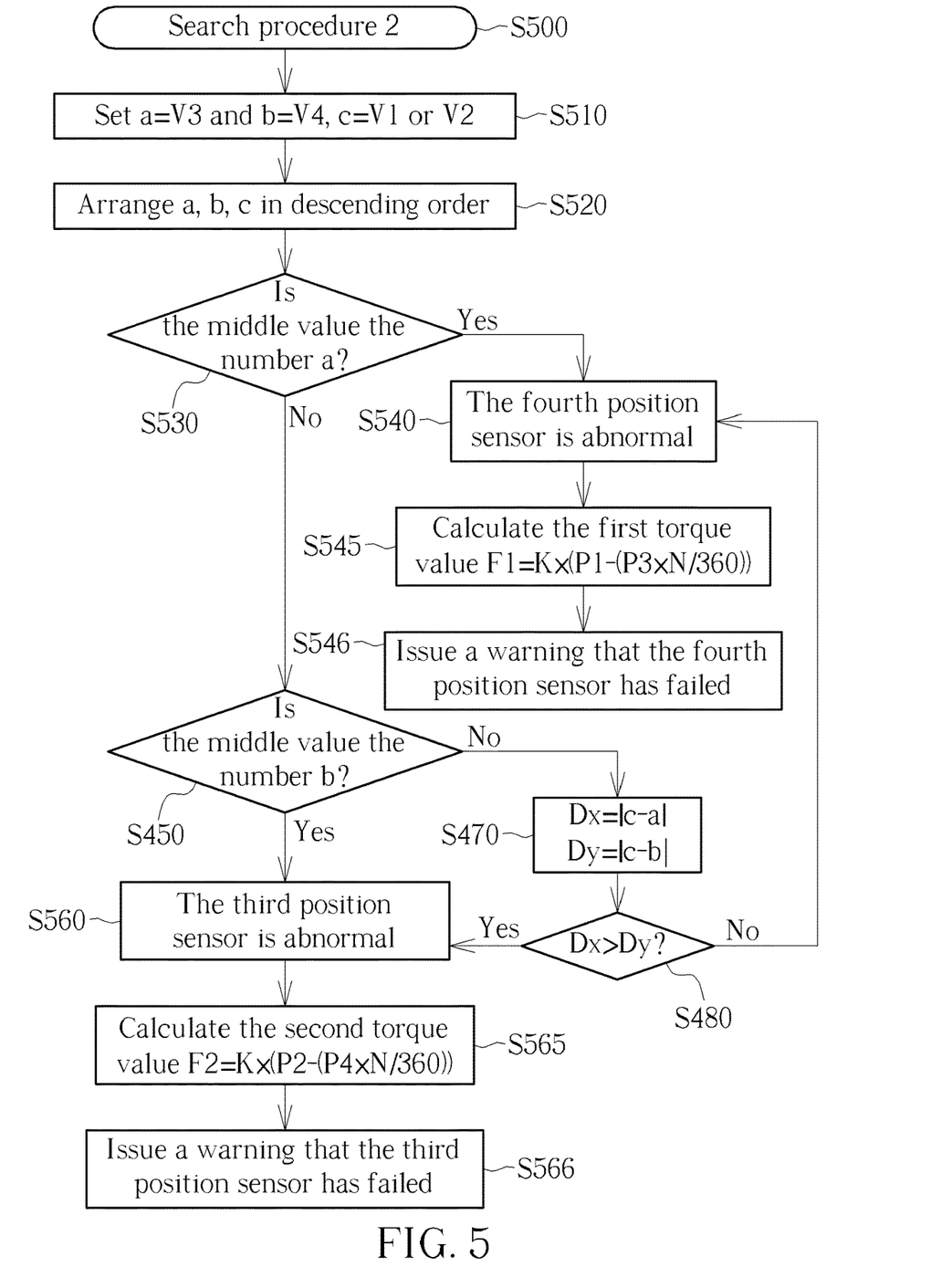
FIG. 5 is a flowchart of the search procedure 2 for searching the abnormal position sensor in the method for the dual-loop torque sensing system of FIG. 3.

FIG. 5 is a flowchart of the search procedure 2 for searching the abnormal position sensors in the method for the dual-loop torque sensing system 20 of FIG. 3. When the position sensors coupled to the reduction drive 30 are normal but the position sensors couple to the motor 10 are abnormal, the dual-loop sensing system 20 starts to search for the abnormal position sensors according to the search procedure 2. The detailed steps are as follows:

S500: Enter the search procedure 2 for searching the abnormal position sensor;

S510: Set the absolute speed values V3 and V4 to a=V3 and b=V4; because the position sensors coupled to the reduction drive 30 are functioning normally, the first absolute speed value V1 or the second absolute speed value V2 is set as the search threshold value c; proceed to step S520;

S520: Arrange the absolute speed values in descending order;

S530: Determine if the middle value of the three values is the number a; if the middle value is the number a, it indicates the absolute speed value V4 has a large error comparing to the search threshold value c, the corresponding fourth position sensor 44 is abnormal, and the second sensing loop 22 is abnormal; proceed to step S540; if not, proceed to step S550;

S540: Determine that the fourth position sensor 44 is abnormal; proceed to step S545;

S545: Calculate the first torque value $F1=K\times(P1-(P3\times N/360))$ of the first sensing loop 21; proceed to step S546;

S546: Issue a warning that the fourth position sensor 44 has failed.

S550: Determine if the middle value of the three values is the number b; if the middle value is the number b, it indicates the absolute speed value V3 has a large error comparing to the search threshold value c, the corresponding third position sensor 43 is abnormal, and the first sensing loop 21 is abnormal; proceed to step S560; if not, proceed to step S570;

S560: Determine that the third position sensor 43 is abnormal; proceed to step S565;

S565: Calculate the second torque value $F2=K\times(P2-P4\times N/360)$ of the second sensing loop 22; proceed to step S566;

S566: Issue a warning that the third position sensor 43 has failed.

S570: Calculate the absolute difference between the search threshold value c and the number a, and the absolute difference between the search threshold value c and the number b, $Dx=|c-a|$, $Dy=|c-b|$;

S580: Is Dx greater than Dy? If yes, it indicates that the absolute speed value V3 has greater error, and the corresponding third position sensor 43 is abnormal, proceed to step S560; if not, it indicates that the absolute speed value V4 has greater error, and the corresponding fourth position sensor 44 is abnormal, proceed to step S540.

In summary, the dual-loop torque sensing system of the present invention is equipped with position sensors coupled to the motor and the reduction drive instead of torque sensors with high cost and strict installation conditions. The dual-loop torque sensing system of the present invention can detect the difference in the rotational position of the motor and the reduction drive for output torque measurement to simplify the structure and installation of the torque sensing system. In addition, the dual-loop torque sensing system of the present invention has two sensing loops formed by the motor and the reduction drive with the four position sensors. When one loop fails, the other loop can replace its function to improve the safety of operation. The four position sensors are used to detect which of the sensing loops and the position sensors are abnormal, and an alarm of failure can be issued for repairing while keeping the other sensing loop operating, avoiding the shutdown of the robotic arm and improving production efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dual-loop torque sensing system, comprising:
a reduction drive coupled to a first position sensor and a second position sensor, and configured to reduce an output torque, wherein the first position sensor and the second position sensor are configured to detect a rotation state of the reduction drive;
a motor coupled to the reduction drive, a third position sensor and a fourth position sensor, wherein the third position sensor and the fourth position sensor are configured to detect a motor rotating state;
a first sensing loop having the first position sensor and the third position sensor disposed thereon;
a second sensing loop having the second position sensor and the fourth position sensor disposed thereon; and
a control device coupled to the first sensing loop and the second sensing loop, comprising:
a reading circuit coupled to the first position sensor, the second position sensor, the third position sensor and the fourth position sensor, and configured to read detection values;
a calculation circuit coupled to the reading circuit, and configured to receive the detection values for torque calculation to generate a calculation result;
a comparison circuit coupled to the calculation circuit, and configured to receive the calculation result of the calculation circuit and to output an identification signal or a normal signal according to the calculation result;
a search circuit coupled the comparison circuit, and configured to receive the identification signal, search for abnormal position sensors according to the identification signal, and output a search signal; and
a torque output circuit coupled to the search circuit and the comparison circuit, and configured to receive the search signal or the normal signal, and output a first torque value according to detection values of the first sensing loop and/or output a second torque value according to detection values of the second sensing loop.

2. The dual-loop torque sensing system of claim 1, wherein the calculation circuit receives a first detection value P1 generated by the first position sensor detecting the reduction drive, and a third detection value P3 generated by the third position sensor detecting the motor, and calculates the first torque value $F1=K\times(P1-P3\times N/360)$ according to a reducer parameter K and a reduction ratio N of the reduction drive.

3. The dual-loop torque sensing system of claim 1, wherein the calculation circuit receives a second detection value P2 generated by the second position sensor detecting the reduction drive and a fourth detection value P4 generated by the fourth position sensor detecting the motor, and calculates the second torque value $F2=K\times(P2-P4\times N/360)$ according to a reducer parameter K and a reduction ratio N of the reduction drive.

4. The dual-loop torque sensing system of claim 1, wherein the reading circuit reads detection values of the first position sensor and the second position sensor coupled to the reduction drive, and the third position sensor and the fourth position sensor coupled to the motor at a beginning and an end of a preset time period, and the calculation circuit calculates a first absolute speed value, a second absolute speed value, a third absolute speed value, and a fourth absolute speed value corresponding to each corresponding position sensor according to a length of the preset time period, the detection values, and a reduction ratio, and determines abnormality of each position sensor according the first absolute speed value, the second absolute speed value, the third absolute speed value, and the fourth absolute speed value.

5. The dual-loop torque sensing system of claim 4, wherein:
the comparison circuit receives the first absolute speed value and the second absolute speed value, calculates an absolute difference between the first absolute speed value and the second absolute speed value, and determines whether the absolute difference between the first absolute speed value and the second absolute speed value is less than a threshold value to determine whether the first position sensor and/or the second position sensor is abnormal; and
the comparison circuit receives the third absolute speed value and the fourth absolute speed value, calculates an absolute difference between the third absolute speed value and the fourth absolute speed, and determines whether the absolute difference between the third absolute speed value and the fourth absolute speed is less than the threshold value to determine whether the third position sensor and/or the fourth position sensor is abnormal.

6. The dual-loop torque sensing system of claim 5, wherein when the comparison circuit determines the first position sensor, the second position sensor, the third position sensor and the fourth position sensor are normal, the normal signal is issued to the torque output circuit.

7. The dual-loop torque sensing system of claim 5, wherein when the comparison circuit determines the first position sensor, the second position sensor, the third position sensor and/or the fourth position sensor is abnormal, an identification signal is issued to the search circuit to search for an abnormal position sensor.

8. A method for the dual-loop torque sensing system, the system comprising a reduction drive coupled to a first position sensor and a second position sensor, a motor coupled to the reduction drive, a third position sensor and a fourth position sensor, a first sensing loop having the first position sensor and the third position sensor, a second sensing loop having the second position sensor and the fourth position sensor, and a control device coupled to the first sensing loop and the second sensing loop, the control device comprising a reading circuit coupled to the first position sensor, the second position sensor, the third position sensor and the fourth position sensor, a calculation circuit coupled to the reading circuit, a comparison circuit coupled to the calculation circuit, a search circuit coupled the comparison circuit, and a torque output circuit coupled to the search circuit and the comparison circuit, the method comprising:
reading detection values of the first, second, third and fourth position sensors at a beginning of a preset time period;
reading detection values of the first, second, third and fourth position sensors at an end of the preset time period; and
calculating a first absolute speed value, a second absolute speed value, a third absolute speed value and a fourth absolute speed value corresponding to the four position sensors according to detection values read at the beginning and the end of the preset time period, a reduction ratio and a length of the preset time period;
determining the position sensors coupled to the motor and the position sensors coupled to the reduction drive are normal if an absolute difference between the first absolute speed value and the second absolute speed value is less than a threshold value, and an absolute difference between the third absolute speed value and the fourth absolute speed value is less than the threshold value; and
outputting a first torque value and a second torque value.

9. The method of claim 8, further comprising if the absolute difference between the first absolute speed value and the second absolute speed value and the absolute difference between the third absolute speed value and the fourth absolute speed value is greater than the threshold value, determining at least two of the first position sensor, the second position sensor, the third position sensor, and the fourth position sensor are abnormal, and issuing a notification signal to stop a robotic arm.

10. The method of claim 8, further comprising if the absolute difference between the first absolute speed value and the second absolute speed value or the absolute difference between the third absolute speed value and the fourth absolute speed value is greater than the threshold value, determining at least one of the first position sensor, the second position sensor, the third position sensor, and the fourth position sensor is abnormal.

11. The method of claim 10, further comprising when the absolute difference between the first absolute speed value and the second absolute speed value is greater than the threshold value, setting the third absolute speed value or the fourth absolute speed value as a search threshold value to determine which of the first position sensor and the second position sensor is abnormal accordingly.

12. The method of claim 11 further comprising when the search threshold value is between the first absolute speed value and the second absolute speed value, determining whether an absolute difference between the search threshold value and the first absolute speed value is greater than an absolute difference between the search threshold value and the second absolute speed value to determine which of the first position sensor and the second position sensor is abnormal accordingly.

13. The method of claim 10, further comprising when the absolute difference between the third absolute speed value and the fourth absolute speed value is greater than the threshold value, setting the first absolute speed value or the second absolute speed value as a search threshold value to determine which of the third position sensor and the fourth position sensor is abnormal accordingly.

14. The method of claim 13 further comprising when the search threshold value is between the third absolute speed value and the fourth absolute speed value, determining whether an absolute difference between the search threshold value and the third absolute speed value is greater than an absolute difference between the search threshold value and the fourth absolute speed value to determine which of the third position sensor and the fourth position sensor is abnormal accordingly.

15. The method of claim 8, wherein when the comparison circuit receives a normal signal indicating all position sensors are normal, the calculation circuit calculates the first torque value of the first sensing loop and the second torque value of the second sensing loop according to the detection values of the first, second, third and fourth position sensors at the beginning of the preset time period, a parameter of the reduction drive, and a reduction ratio.

16. The method of claim 8, wherein when the comparison circuit receives an abnormal signal indicating that at least one of the position sensors is abnormal, the first torque value and the second torque value are not calculated.

17. The method of claim 10, further comprising:
when a search signal indicates that the first position sensor or the third position sensor is abnormal, the torque output circuit outputting the second torque value; and
when the search signal indicates that the second position sensor or the fourth position sensor is abnormal, the torque output circuit outputting the first torque value.

* * * * *